United States Patent
Fokkelman

(10) Patent No.: US 10,262,291 B2
(45) Date of Patent: Apr. 16, 2019

(54) SYSTEM FOR DELIVERING SHIPPING ITEMS

(71) Applicant: CONTINENTAL AUTOMOTIVE GMBH, Hannover (DE)

(72) Inventor: Joris Fokkelman, Tegernheim (DE)

(73) Assignee: Continental Automotive GmbH, Hannover (DE)

(*) Notice: Subject to any disclaimer, the term of this patent is extended or adjusted under 35 U.S.C. 154(b) by 768 days.

(21) Appl. No.: 14/652,048

(22) PCT Filed: Nov. 21, 2013

(86) PCT No.: PCT/EP2013/074352
§ 371 (c)(1),
(2) Date: Jun. 12, 2015

(87) PCT Pub. No.: WO2014/090536
PCT Pub. Date: Jun. 19, 2014

(65) Prior Publication Data
US 2015/0324744 A1 Nov. 12, 2015

(30) Foreign Application Priority Data

Dec. 14, 2012 (DE) .................. 10 2012 223 152

(51) Int. Cl.
*G06Q 10/08* (2012.01)
*G06Q 30/00* (2012.01)

(52) U.S. Cl.
CPC ......... *G06Q 10/0835* (2013.01); *G06Q 10/08* (2013.01)

(58) Field of Classification Search
USPC ......................................................... 705/336
See application file for complete search history.

(56) References Cited

U.S. PATENT DOCUMENTS 6,297,731 B1   10/2001  Flick
2003/0102958 A1*  6/2003  Gudmundsson ........ B60R 25/04
                                                        340/5.7
(Continued)

FOREIGN PATENT DOCUMENTS

DE           199 45 052 A1    4/2001
DE      10 2005 001480 B3    10/2006
(Continued)

OTHER PUBLICATIONS

Deutsche Wikipedia zum Begiff Authentifiziergun. Nov. 15, 2012 URL: Http://de.Wikipedia.org/w/index.php?title+Authntifizierun&oldid+110517130 [abgerufen am Jul. 19, 2013].

*Primary Examiner* — Garcia Ade
(74) *Attorney, Agent, or Firm* — Cozen O'Connor

(57) ABSTRACT

A system for delivering shipping items in vehicles includes a first communication module establishing a communication link to a communication terminal of a delivery person, the communication terminal receiving authorization data via a communication network; a first identification routine unambiguously identifying a delivery person; a second communication module establishing, via a wireless communication network, a communication link to a communication device of a control unit of the access arrangement on a vehicle; a second identification routine for unambiguously identifying the system by the access arrangement; a third communication module for receiving update request data from the driver; and an update routine for updating authorization data in a memory of the system. Upon updating authorization data, information is wirelessly transmitted relating to the successful delivery and the content of the delivery to the access arrangement. The driver assistance system displays an alert message about the delivery.

9 Claims, 5 Drawing Sheets

(56) References Cited

U.S. PATENT DOCUMENTS

| | | |
|---|---|---|
| 2003/0193413 A1 | 10/2003 | Jones |
| 2005/0190039 A1 | 9/2005 | Aoyama et al. |
| 2005/0232438 A1 | 10/2005 | Basir et al. |
| 2005/0288837 A1 | 12/2005 | Wiegand et al. |
| 2006/0010037 A1 | 1/2006 | Angert et al. |
| 2006/0143463 A1* | 6/2006 | Ikeda ............... B60R 25/04 713/182 |
| 2006/0290319 A1 | 12/2006 | Burgan et al. |
| 2008/0066186 A1 | 3/2008 | Hammes |
| 2008/0150679 A1* | 6/2008 | Bloomfield ........... B60R 25/24 340/5.7 |
| 2009/0140511 A1* | 6/2009 | Pestl ................. B42D 1/08 281/31 |
| 2009/0150306 A1 | 6/2009 | Campbell |
| 2009/0240511 A1* | 9/2009 | Darrouzet ........... G06Q 10/08 705/1.1 |
| 2012/0007741 A1 | 1/2012 | Laffey, Sr. et al. |
| 2012/0253548 A1* | 10/2012 | Davidson ............ G06Q 10/08 701/1 |
| 2013/0203400 A1* | 8/2013 | Ricci ................ H04W 4/046 455/418 |

FOREIGN PATENT DOCUMENTS

| | | |
|---|---|---|
| DE | 10 2007 009 741 A1 | 10/2007 |
| DE | 102006042358 A1 | 3/2008 |
| DE | 10 2008 009 427 A1 | 8/2009 |
| EP | 1609682 | 12/2005 |

\* cited by examiner

SYSTEM FOR DELIVERING SHIPPING ITEMS

CROSS-REFERENCE TO RELATED APPLICATIONS

This is a U.S. national stage of application No. PCT/EP2013/074352, filed on 21 Nov. 2013, which claims priority to the German Application No. DE 10 2012 223 152.8 filed 14 Dec. 2012, the content of both incorporated herein by reference.

BACKGROUND OF THE INVENTION

1. Field of the Invention

The present invention relates to a system for conveying consignments, i.e., delivering shipping items.

2. Related Art

Delivery services that need to distribute or collect consignments, such as packages and letters, expend a great deal of effort to get from delivery address to delivery address. As a result, a large amount of time elapses and the driving profiles for the delivery vehicles are fairly inconvenient.

US 2009 0 150 306 A1 proposes that performance of the service be followed by the leaving of a note on/in the vehicle saying that a service has been performed.

DE 10 2007 009 741 A1 describes how important items in the vehicle are provided with RFID tags and a warning is output if particular items are forgotten when leaving the vehicle.

US 2006 0 290 319 A1 (Motorola) describes how the presence of a portable appliance in a charging station is identified and notification is provided when leaving the vehicle if an appliance is still in a charging station.

US 2012 0 007 741 A1 discloses that the start of a journey prompts querying/input of what has been placed into the vehicle.

DE 10 2008 009 427 A1 describes the administration and display of an unlocking protocol for an infotainment system that indicates whether unlocking/locking has taken place in the meantime.

Vehicles are by now frequently equipped with what are known as "keyless entry units" that allow the vehicle to be unlocked/locked externally by radio. This requires a control unit that is situated in the motor vehicle and that communicates by radio signals with an external unit that is usually integrated in a key or in an authorization card for the vehicle. The control unit situated in the vehicle and the external unit, also called an external identification unit, which the driver usually carries with him, make radio contact after both have been activated. Both units then use radio to interchange data that contain a stored code. If this code matches between the identification unit and the control unit, the vehicle is opened or closed by the authorized driver.

The term consignment is understood to mean all paperwork or items that can be transferred to a recipient or collected from a sender for transport to a delivery address using a company. By way of example, these include correspondence, consignments of small goods and money transfers. The consignments are usually conveyed to the residential address of the person in question. A mail recipient of a consignment is that person who is named in the address and for whom a (mail) consignment is intended. This may be a natural or a legal person, e.g., an institution, a corporation or a company, for example. A residential address is the mailing address of a residence in which a person permanently lives. This may be the main residence or the secondary residence.

A residential address normally consists of the indication of the street, house number, the town and the country. In some cases, the apartment or room number or the floor, the part of the building (e.g., rear building) and a sublet relationship ("c/o") is/are also indicated. For the sending of consignments (mail), the residential address also contains the zip code and if need be the district or borough. If the residential address is on a housing estate, instead of the street the name of the housing estate and the house number are quoted.

A mail recipient is also understood to mean the person who actually receives a mail item. This person may, but does not have to, be the person addressed (addressee). He may be instructed by the recipient to receive the mail item. Mail items are usually put into the building mailbox. Certain consignments, such as those with the consignment form "By registered mail" or with a "notice of delivery", are normally delivered to the recipient directly, as are telegrams and express deliveries. Some consignments, e.g., undeliverable packages, are not placed into the mailbox. In these cases, the recipient receives a notification card.

Frequently, it is the case that the person in question cannot be found at the residential address upon delivery and a notification, which has already been mentioned, is left by a mail or delivery service concerning how, where and when the consignment can be conveyed again. These inefficient logistics give rise to additional environmental pollution and costs because, by way of example, engines in the delivery vehicles are often used outside the optimum operating range. Furthermore, the delivery vehicles are often a traffic obstruction because the drivers rarely look for a parking space for the short stopping times but rather simply stop with hazard lights, and it is necessary to drive to the residential address repeatedly in order to convey the consignments.

SUMMARY OF THE INVENTION

It is an object of the invention to render the conveyed delivery of consignments or ordered goods distinguishable for the driver. Advantageously, this alerts the driver at a convenient time to his delivery for which the driver needs to be active.

According to an aspect of the invention, the driver or one of the passengers is made aware of the delivery by a warning signal when they get into or leave the vehicle. By way of example, the inventive indication of the warning signal is provided by signaling, which can use driver assistance systems to output a warning to the driver or the passengers.

The warning signal contains the notification that a particular piece of luggage or delivery is in the trunk or a service has been performed on the vehicle.

Driver assistance systems are electronic supplementary devices in vehicles for assisting the driver in particular driving situations. Often, safety aspects, but especially increasing the driving comfort, are of primary importance in this context. These systems semiautonomously or autonomously influence drive, control (e.g., acceleration, braking) or signaling devices of the vehicle or use suitable man/machine interfaces to warn the driver shortly before or during critical situations. Examples of such driver assistance systems are parking aid (sensor arrays for obstacle and distance recognition), brake assist system (BAS), cruise control, adaptive cruise control (ACC), distance control, turning assistant, queue assistant, lane recognition system, lane keeping assistant/lane assistant (lane departure warning (LDW)), lane keeping support, lane change assistance, lane change support, intelligent speed adaptation (ISA), adaptive bend light, tire pressure control system, driver state recognition, traffic sign recognition, platooning, automatic emergency braking (ANB), full/dipped beam assistance for headlights and night vision system.

According to an aspect of the invention, the displays and interaction options that can be actuated by a driver assistance system serve as an output, via a man/machine interface, for the warning signal about a delivery that has been made. Such displays and interaction options can be output audibly and/or visually and/or haptically with the driver or passenger. By way of example, this can involve seat recognition, the engine off function, door opening and the information about arrival at the destination being provided in a navigation system that is integrated in a driver assistance system. By way of example, the warning signal can be provided as notification on a display or audibly by a voice or sound signal via a terminal. In principle, all outputs that are directly or indirectly suitable for multimodal interaction with a passenger and the driver can be used.

According to an aspect of the invention, the statement about the type of delivery is also made: the content that the delivery has. In other words, the system according to the invention is used to transmit a piece of information to the vehicle concerning what type of delivery has been made. On the basis of the type of delivery, action is required concerning whether the delivery needs to be handled in a particular manner by the driver or by the passengers. This is the case when a delivery that needs to be kept warm or cool is involved.

The object is achieved by the features of the inventive system set forth in the claims.

A preferred embodiment of the system for conveying consignments in vehicles is distinguished in that this system consists of a first communication module M1 for setting up a communication link to a communication terminal of a supplier of the authorization data via a communication network N1, a first identification routine for explicit identification of the supplier, a second communication module M2 for setting up a communication link via a wireless communication network N2 to a communication device of a controller of the entry arrangement of a vehicle, a second identification routine for explicit identification of the system by the entry arrangement, a third communication module M3 for receiving an update request information item from the driver and an update routine for updating authorization data in a memory.

In one advantageous refinement of the system, the wireless communication network N2 is a mobile radio communication network. In a further particularly advantageous refinement of the system, structure for identifying the user by virtue of voice recognition, by virtue of the transmission of an identification information item—PIN/TAN—or by virtue of a challenge/response method are provided.

A further advantageous refinement of the inventive system is distinguished in that following execution of the update routine for the purpose of updating authorization data the system uses a wireless communication network to transmit a piece of information about the delivery that has been made and the content of the delivery to the communication device of the controller of the entry arrangement of the vehicle, wherein the controller of the entry arrangement of the vehicle uses a bus system in the vehicle to produce a message for a driver assistance system about the delivery that has been made and the driver assistance system uses a man/machine interface to display a warning message about the delivery.

A further advantageous refinement of the inventive system is distinguished in that the bus system in the vehicle is a CAN bus.

A further advantageous refinement of the inventive system is distinguished in that the bus system in the vehicle is an Ethernet.

A particularly advantageous refinement of the system is distinguished in that the warning message is displayed by a driver assistance system only after a check to determine whether the passenger has left his seat and the entry arrangement has been activated by the opening of a door.

A further refinement is distinguished in that structure for identifying the supplier by virtue of the use of an explicit cryptographic information item are provided.

A particularly advantageous embodiment of the system has structure for setting up a communication link via the wireless communication network N2 via a mobile radio communication network and/or WLAN network, which may also be embodied as vehicle-to-vehicle or vehicle-to-infrastructure communication.

In a further, very safe embodiment, structure for encrypting the communication between the communication device of the system and the communication device of the entry arrangement by using a shared secret are provided.

The object is also achieved by a method for conveying consignments in vehicles. This involves registration of the vehicle being performed as a first step. Next, the position of the vehicle is ascertained, and then a position of the parked vehicle is released as the delivery address to the system by a communication device via a communication network N2. The position of the parked vehicle or the stationed vehicle is transmitted by a communication unit via a communication network N2. Furthermore, the authorization clearance for the opening of at least one door and/or a trunk of the vehicle by a supplier is transmitted by a communication device of the system to a communication terminal of the supplier, with opening being valid within a particular time window. Transmission of a radio signal that contains an authorization clearance, wherein available authorization involves the entry arrangement activating opening of at least one door and/or a trunk of the vehicle, is performed, and opening and conveyance of the consignment by virtue of the manual closing of a door and/or the trunk of the vehicle by the supplier are followed by the conveyance of the consignment by the supplier being confirmed to the communication terminal of the driver via the system by the communication device via the communication network N2. Following transmission of an update request by the communication device of the driver, authorization data are updated in the controller of the entry arrangement.

In one advantageous refinement, notification of the delivery can be provided by virtue of the vehicle using the communication device to transmit an SMS, E-mail or other electronic notification to the driver as a data packet via the communication network N2, to the communication terminal, concerning the successful delivery or deliveries that have not been made within the prescribed time window. When the driver opens the vehicle, the entry arrangement provides him with a brief notification that is presented audibly or visually on the screen of the communication terminal and indicates that a new delivery has been received or a package has been collected at a particular time. The intention of the invention in outputting that a delivery has been made is that a warning is output when getting out if there are still delivered goods in the trunk, for example. This is intended to remind the driver not to forget the delivered goods in the vehicle when he leaves the vehicle.

In a further advantageous refinement, the delivery that has been made is confirmed by virtue of the vehicle, following the delivery and the closing of the trunk or the doors, outputting confirmation to the system in order to signal that the vehicle is closed again. If the vehicle is not locked again in a period, the communication terminal of the supplier is provided with a warning notification via the system indicating that the vehicle is not properly closed. Irregularities in connection setup could also be logged in order to detect a possible break-in.

The intention of the invention is that visual, audible, sensory documentation of the delivery is provided by an onboard camera. This type of documentation also simultaneously serves as an identification unit that can be used according to the invention to identify the delivery that has been made. The intention in this regard is that when the vehicle is opened, cameras in the vehicle that are fitted in the vehicle for these or other purposes take photographs or film and are triggered by the entry arrangement. The intention is also that cameras are fitted in the trunk. A particular advantage is the use of cameras that are fitted for blind spot detection, parking assistance, support for adaptive restraint systems, sleep warning systems or other purposes and are actuated by the entry arrangement when the trunk or the doors are opened. The films or photographs can avoid or shed light on any instances of misuse. Sensor values from acceleration sensors or what are known as structure-borne sound sensors or microphone signals are likewise used for documentation purposes for the effected conveyance of the consignment.

In a further advantageous refinement, the position of at least one free stationing area is computed from the current position of the vehicle, and transmitted to a navigation apparatus of the vehicle, on the basis of vehicle-to-vehicle and/or vehicle-to-infrastructure communication. In this case, the navigation apparatus can transmit the position to the system via the communication devices.

A further refinement of the inventive method is distinguished in that the position of the free stationing area is transmitted to the navigation apparatus when the vehicle is situated in a previously defined region in relation to the free stationing area, preferably in proximity to a barrier of a parking facility.

A very advantageous refinement is characterized in that after the vehicle is stationed on a selected free stationing area the position of the selected stationing area is transmitted to a storage medium that the driver is preferably able to transport, preferably a key of the vehicle and/or a mobile telephone of the driver and/or a chip card, is then stored on the storage medium and is preferably additionally displayed.

One advantageous refinement is distinguished in that the navigation apparatus or the storage medium transmits the position of the selected stationing area to the system via a parking space management system of the parking facility.

In a further refinement, when the selected stationing area is left, the position of the stationing area that is now free again is transmitted to the system via the parking space management system of the parking facility.

In a further advantageous refinement, the position of the at least one free stationing area is computed from a distance measurement from at least one vehicle or at least one infrastructure element to other vehicles or to other infrastructure elements that are arranged within a circle of previously stipulated radius around the vehicle looking for a free stationing area.

One advantageous refinement is characterized in that the at least one infrastructure element transmits further information concerning the stationing area situation, preferably about resident parking zones or stopping restrictions, and/or provides the information from a digital map of the navigation apparatus and uses it to compute the position of the at least one free stationing area.

In a further refinement, the supplier is identified by voice recognition, by transmission of an identification information item—PIN/TAN—or by a challenge/response method. A further refinement is characterized in that the system is identified by the use of an explicit cryptographic information item.

In a further particularly advantageous embodiment, the communication link via the wireless communication network N2 is set up via a mobile radio communication network and/or WLAN network.

In a further advantageous refinement, the communication between the communication device of the system and the communication device of the entry arrangement and the communication device of the supplier is encrypted by virtue of the use of a shared secret.

An advantage of the inventive method is that by virtue of this management of whereabouts of the vehicles to be located logistic synergistic effects are produced, since a high level of automation is provided for the transmission of the consignments to the relevant vehicles. For a delivery service, the invention is used to attain reduced effort for the delivery time and reduced energy consumption with all the environmentally beneficial side effects.

A further aspect of the invention is that a communication link is set up between an authorized supplier, who receives the relevant authorization data from the inventive system, and the entry apparatus of the vehicle. When the system or the mobile terminal of the supplier has been successfully identified, the authorization data in the controller of the entry arrangement are updated and accordingly activated for the conveyance operation of the supplier, so that the consignment in the trunk or in the passenger compartment is approved for the supplier by virtue of the authorized approval of opening of the vehicle doors or tailgate of the trunk by means of the controller, so that the consignment can be safely conveyed therein. According to the invention, the trunk is the space in the vehicle that is intended for transporting cargo. Normally, it is at the rear, some vehicle types having it at the front. In automotive engineering, the passenger compartment denotes the space that contains the vehicle occupants.

In addition, following initiation by the driver on the system, the method can take place in fully automated fashion, that is to say quickly and without cost-incurring employment of personnel. The use of an existing mobile radio infrastructure and the opportunity to implement that largely using commercially available server components also reduces costs. Furthermore, the automation minimizes the risk of incorrect inputs. A further advantage of the invention is the opportunity for the updating of the authorization data to be able to take place directly via a mobile terminal of the driver and of the supplier.

The inventive vehicle provides a reliable and safe way for a supplier to be able to open the trunk, for example, but for this not to critically endanger theft prevention. It is possible to use an alternating code method, which can be used once, just in a time window, by the supplier only and expires after being used once.

The vehicle or the driver log on via communication links in an infrastructure unit, such as a parking block management system, connected to the inventive system, this logon involving the inventive system being notified of when and where the vehicle is parked in order to be able to receive a consignment via a supplier. In this context, the infrastructure and the resultant information service advantageously ensure that the deliveries can be conveyed by the delivery service in optimized fashion as a result of optimized grouping of consignments.

The intention of the transmission of the authorization to open the relevant vehicle is also that transmission of the authorization from the mobile terminal of the supplier or the delivery vehicle networked thereto involves all vehicles in the vicinity that are expecting a delivery reacting to the radio signal produced by the supplier with a light signal. This facilitates location by the supplier in order to find the relevant vehicles quickly, and, as already mentioned, it is possible for the trunk or the doors to be opened only using the special individual alternating code.

Further advantageous developments of the inventive method and of the system for conveying consignments can be found in the further claims.

BRIEF DESCRIPTION OF THE DRAWINGS

The inventive method is explained in more detail below with reference to drawings, in which, schematically.

DETAILED DESCRIPTION OF THE PRESENTLY PREFERRED EMBODIMENTS

Figure 1:
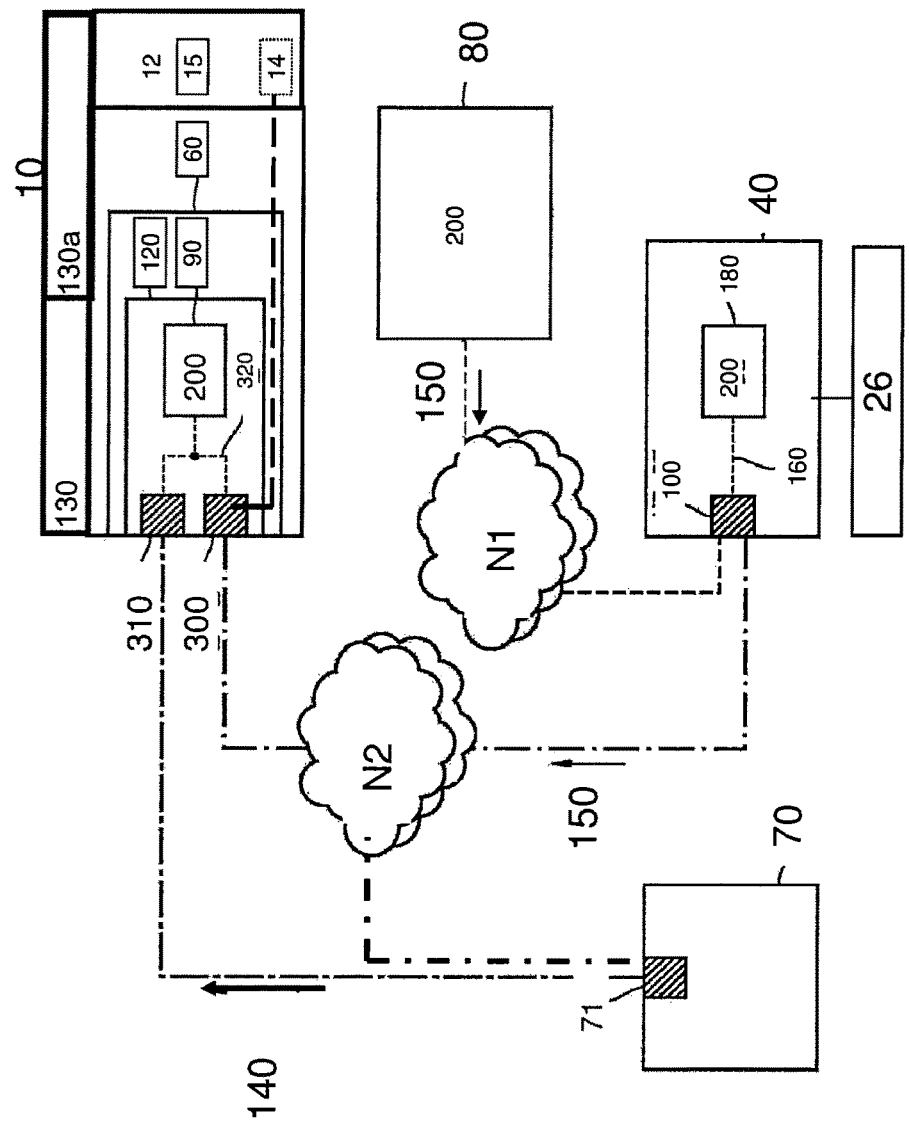
FIG. 1 shows a vehicle with a communication apparatus and a schematic illustration of an arrangement for implementing the inventive method and the system.

A vehicle 10 that is shown schematically in FIG. 1, for example an automobile or a truck that needs to be parked on a stationing area, is equipped with a positioning system, for example a GPS system 12, that contains a computation apparatus 14 and a navigation apparatus 15. FIG. 1 also shows a system 40 for conveying consignments. This involves the performance of updating for authorization data 200 from an entry arrangement 60 of the vehicle 10 and a communication terminal 70 of the supplier. The system 40 may be a server-based solution that has the usual components and peripherals, such as processor, memory, network access, operating system, application software, etc.—not shown. In addition, a first communication network N1 and a second communication network N2 are depicted.

By way of example, the communication terminal 70 of the supplier is a mobile radio terminal, a multifunctional smart phone, a chip card or a similar terminal with radio communication capability having a memory that has at least one communication device 71. The system 40 has a communication device 100 that the system 40 can use to communicate both with the communication network N1 and with the communication network N2. Furthermore, in the system 40, the communication device 100 is connected to a data module 180 via a data bus 160 by using relevant communication protocols. This data module 180 or another competent device has allocated or managed the authorization data 200 originally. The communication terminal 80 of the driver is likewise connected to the communication network N1, for example wirelessly.

The vehicle 10 has an entry arrangement 60. This entry arrangement 60 has a controller 120. This controller 120 is connected to the communication network N2 via a communication device 300. Likewise in the controller 120, a memory 90 stores the authorization data 200 of authorized suppliers of the entry arrangement 60.

Furthermore, the mobile terminal or communication terminal of the supplier 70 is shown, which has a communication device 71. This mobile terminal allows its communication device 71 to be used to transmit a coded and encrypted radio signal 140 to a communication device 310 of the controller 120 of the entry arrangement 60. A radio signal is understood to mean a communication signal, this being based on electromagnetic signals, including optical signals (e.g., infrared light). The vehicle 10 reacts to a particular encrypted radio signal 140 from the communication terminal 70 of the supplier, which radio signal is preferably limited to a particular time window and is cancelled following use of the opening command. The radio signal 140 provides entry authorization, but not driving authorization to start the vehicle. According to the invention, an active alarm system—not shown—is modified for the period of authorized conveyance of the consignment to the vehicle 10 such that an alarm is not triggered.

The radio signal 140 can be used to initiate various functions of the entry arrangement 60. This may be the opening or closing of the door locking system or the trunk locking system, for example. In this case, the communication terminal 70 of the supplier is assigned particular information and the controller 120 is assigned user data 200, for example determined by the data module 180 of the system, and the information and user data are stored. The user data allow the entry arrangement 60 of a particular vehicle 10 to be operated only using a particular communication terminal 70 of the supplier. The memory 90 and the communication devices 300 and 310 are connected to one another via a data bus 320 by using relevant communication protocols.

The radio signal is used to transmit data packets that, as a first data element, are able to comprise a vehicle identification, the vehicle color, vehicle type, vehicle license plate, a digital identification code, a telephone number, as a second data element, are able to comprise the vehicle position or a URL for a service, such as an IP-based parking space management system 26, where the vehicle position can be queried, and as a third data element, an entry code that allows a profiled entry for the supplier but does not provide driving authorization and becomes invalid after a particular time. Alternatively, further data fields are used, such as "search code", "door opening approval", "consignment requires cooling after the vehicle is opened". Furthermore, the data packet contains elements that allow the property of the delivery that has been made to be inferred.

The communication terminal 80 of the driver, which is likewise a mobile phone, smart phone, a multifunction car key or chip card, contains, or receives from the vehicle 10 via the system 40, a particular number of entry codes that can be used by the driver when shopping, for example. When the driver wishes to pay for something and have it delivered, an entry code for the vehicle 10 is communicated from the communication terminal 70 of the driver to a device at the checkout of the relevant store to the system 40 via the communication network N1 or N2. In this case, the entry codes can have a validity period of a few hours and can no longer be used after they expire.

In this variant of the allocation of the authorization, the vehicle 10 does not necessarily need to be directly networked to the environment. The entry codes prepared in the communication terminal 80 of the driver become valid when the driver gets out, which involves determination of the period of the time at which he gets out+X hours, X hours being the period of the stay in the parking space for the duration of shopping, which the driver inputs in a predetermined manner using a human machine interface (HMI)—not shown—of the vehicle 10 and which is then transmitted to the communication terminal of the driver 80.

Following explicit identification of the authorized supplier, the authorization data 200 produced by the communication device 100 of the system 40 is sent via the communication network N2 a communication link to the communication device 300 of the controller of the entry arrangement 60.

The communication terminal 70 of the supplier is then explicitly identified by the controller 120 of the entry arrangement 60. This can be done by using an explicit cryptographic key, for example. In this case, it is not necessary for this step to take place at a time immediately after the identification of the supplier and the stipulation of the update request.

One possibility for the identification or authentication of the communication terminal 70 of the supplier by the controller 120 of the entry arrangement 60 is a challenge/response method, for example. A prerequisite of this is that the controller 120 of the entry arrangement 60 and the communication terminal 70 of the supplier have a shared cryptographic secret. This secret is expediently produced, either by the controller of the entry arrangement 60 or by the system, when the driver first logs on/registers in the system 40. The secret is then stored in the memory 90 in the controller 120 and also in the memory 90 in the system. Following the start of communication between the communication terminal 70 of the supplier and the controller SG via the communication network N2, the controller 120 will send a challenge to the system and the communication terminal 70 of the supplier, from which challenge the system and the communication terminal 70 of the supplier compute the response using the cryptographic secret and send the response back to the controller SG of the entry arrangement 60 via the communication network N2. This method furthermore has the advantage that the subsequent further communication between the system, the communication terminal 70 of the supplier and the controller 120 via the communication network N2 for the purpose of transmitting the update request 150 can also take place in encrypted form using the shared secret and therefore there is no prerequisite for the protocols taking place via the communication network N2 to provide adequate data integrity per se.

The relatively simple method for identification or authentication of the system by the controller 120 of the entry arrangement 60 is the use of a PIN code possibly together with a one-time TAN code. These codes, that is to say PIN and possibly a sufficient quantity of TAN codes, are expediently produced, either by the controller 120 of the entry arrangement 60 or by the system 40, and stored in the memory 90 of the controller 120 and also in the system 40 when the driver first logs on/registers in the system 40. In this case, the communication takes place in unencrypted form, and there is a prerequisite for the protocols taking place via the communication network N2 to provide adequate data integrity.

Alternatively, the radio signal can be split between the communication terminal 80 of the driver and the communication terminal of the supplier 70 such that the transmitted data packets between the driver and a supplier in the entry arrangement 60, so that the data packet is transmitted to some extent by the driver mobile phone or e-mail or comparable technology, is stored with the supplier to some extent and the two partial packets yield an entry code or authorization data 200 only together. This method advantageously prevents an entry code from being monitored during transmission and the vehicle 10 from being opened without authorization.

In a variant of this method, the system 40 itself does not store any identification data. Rather, the system 40 transmits the identification data from the supplier to the controller 120 after the communication between the system and the controller 120 has been set up.

In this case, the identification data (e.g., PIN code or TAN codes) are firstly stored in the memory 90 of the controller 120.

Secondly, they are known to the supplier or stored in a memory 90 in its communication terminal 70, for example.

Following explicit identification of the system 40 to the controller 120, the update request 150 from the driver is transmitted from the communication device 100 of the system 40 to the communication device 300 of the controller 120 via the communication network N2. The authorization data 200 in the memory 90 of the controller 120 of the entry arrangement 60 are then updated in accordance with the update request 150.

Figure 2:
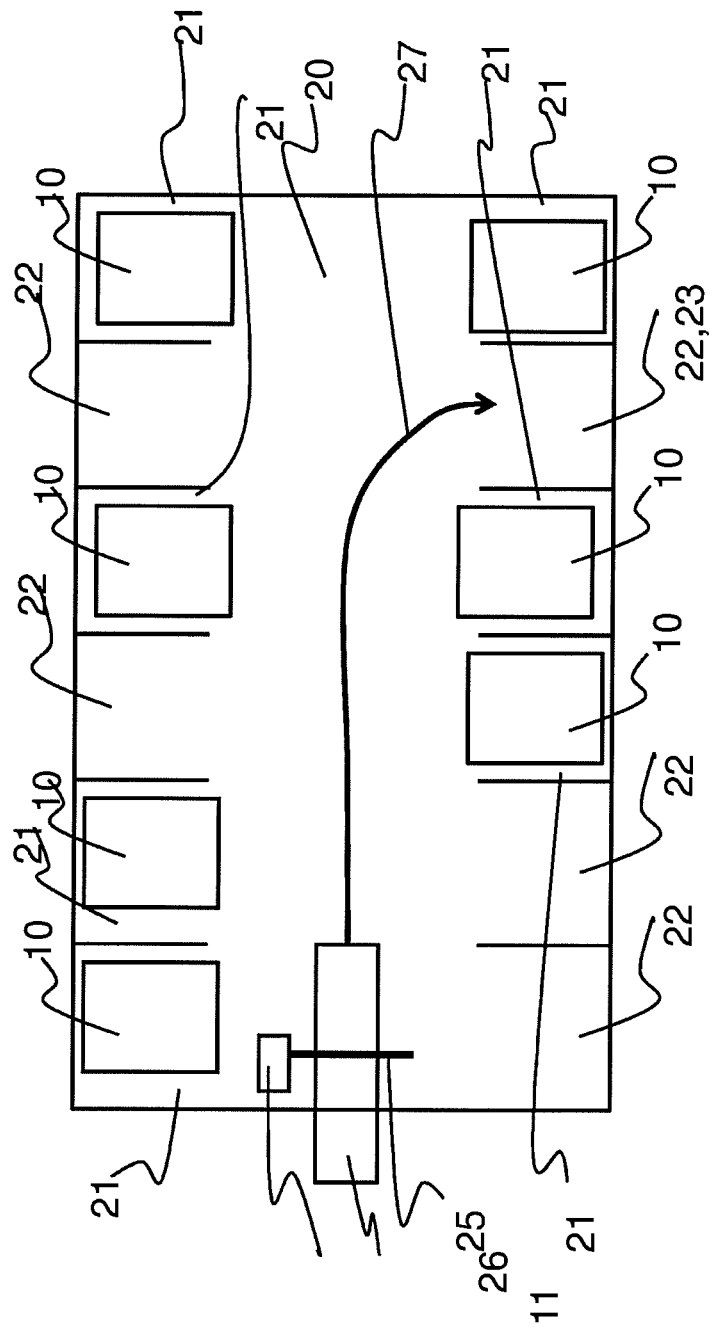
FIG. 2 shows a first exemplary embodiment of the use of the inventive method in a parking facility.

FIG. 2 shows a vehicle looking for a parking space. When an arriving vehicle 11 looks for a stationing area in a parking facility, for example in a parking block 20, which is shown in FIG. 2, the vehicle is initially at an entry barrier 25 to the parking block 20. The arriving vehicle 11 has similar equipment to the vehicle 10 shown in FIG. 1.

The parking block 20 has stationing areas 21 that are occupied by vehicles 10. By contrast, the stationing areas 22 are free, which means that it is possible to park in those areas.

At the entry barrier 25 to the parking block 20, short-range radio (e.g., infrared, Bluetooth, DSRC, ITS-G5, W-LAN, etc.) is used to transmit information about which stationing areas 22 are free from the parking space management system 26 integrated in the entry barrier 25 to the computation apparatus 14 of the arriving vehicle 11 via the communication link, i.e., by vehicle-to-infrastructure communication, using the communication devices 300/310. By way of example, the positions of the free stationing areas 22 can be indicated as absolute positions in the GPS system 12 or as relative positions, e.g., in relation to the position of the barrier 25.

Following transmission of the information about free stationing areas 22, the GPS system 12 is put into what is known as parking block mode. On the basis of the data transmitted by the parking block, the computation apparatus 14 then computes the positions of the free stationing areas 22 in the reference system of the vehicle-based GPS system 12 and presents them to the driver on a special display provided for this mode. The driver can then select a stationing area that he finds suitable for his arriving vehicle 11 and confirm clearance for this position as a delivery location.

The navigation apparatus 15, which is provided with the computed position data by the computation apparatus 14, can then be used to ascertain route guidance 27 to a stationing area 23 selected by the driver, for example, and to make this route guidance available to the driver. The driver then moves his vehicle to the selected stationing area 23 on the basis of the computed route guidance 27 and parks his vehicle 11 in the stationing area. Route guidance is advantageous particularly in large, confusing and highly frequented parking facilities, for example multistory parking blocks.

When the arriving vehicle 11 is then stationed on the selected stationing area 23 in the parking block, the navigation apparatus 15 of the vehicle 11 stores its position. This function can be triggered by virtue of the engine being turned off at the position of the selected stationing area 23, for example. The stored position of the now occupied stationing area 23 is transmitted by the navigation apparatus 15 to the memory 90, or by the communication device 300 to the system 40 and the key of the vehicle, to a mobile telephone of the driver or to another device (e.g., chip card) with a preferably wireless communication option for the driver 80. The position of the stationing area 23 can be displayed on the storage medium in the communication terminal 80 of the driver on request. This allows the driver to find his vehicle 11 more quickly when returning to it.

The driver then leaves the parking block 20. At the exit, the system 26 accords, e.g., by querying the storage medium, the stationing area on which the vehicle 11 is standing. Since the storage medium has stored the position of the vehicle 11 or the selected stationing area 23, it transfers it to the parking space management system 26 of the parking block 20. The parking space management system 26 then knows that the stationing area 23 that was selected by the driver and the position of which has been transmitted to the parking space management system 26 is occupied. The parking space management system 26 also transmits this position to the system 40 for verification purposes, since said system once again checks whether the vehicle is actually located where the driver stationed it upon confirmation as a delivery location.

After some time, the driver returns to the parking block 20 in order to continue his journey in his vehicle 11. Alternatively, the driver is also able to key in/set the alphanumeric parking marker indicated at the parking space, which the driver received when stationing the vehicle, directly into the memory of his communication terminal 80.

In a preferred exemplary embodiment, there exist in the parking block 20 a multiplicity of reading points to which the position of the vehicle 11 can be transmitted from the storage medium. Such a reading point is located at the barrier 25 and/or at the doors and/or automated checkouts of the parking block, for example. Such a reading point indicates the position of the vehicle 11 and possibly the way to the vehicle upon request from the driver, so that the driver can transmit his vehicle 11 the position of the stationed vehicle to the delivery service and the driver can find his vehicle again quickly. The position that the navigation apparatus 15 stores for the vehicle 11 on the stationing area 23 is preferably also used as a starting position for the next route that is computed by the navigation apparatus 15. The position of the stationing area 23 that has become free is transmitted to the parking block management system 26 by the storage medium or the navigation apparatus 15 by short-range radio when the vehicle 11 exits. The parking space management system 26 then knows that the corresponding stationing area 23 on which the vehicle 11 had previously parked is now free again.

Instead of the short-range communication with the parking block management system 26, communication can also take place with a corresponding parking space management server via GPS, UMTS, LTE, WiMax, W-LAN, etc.

The proposed method can be implemented with comparatively little technical effort and without additional hardware in the vehicle.

Figure 3:
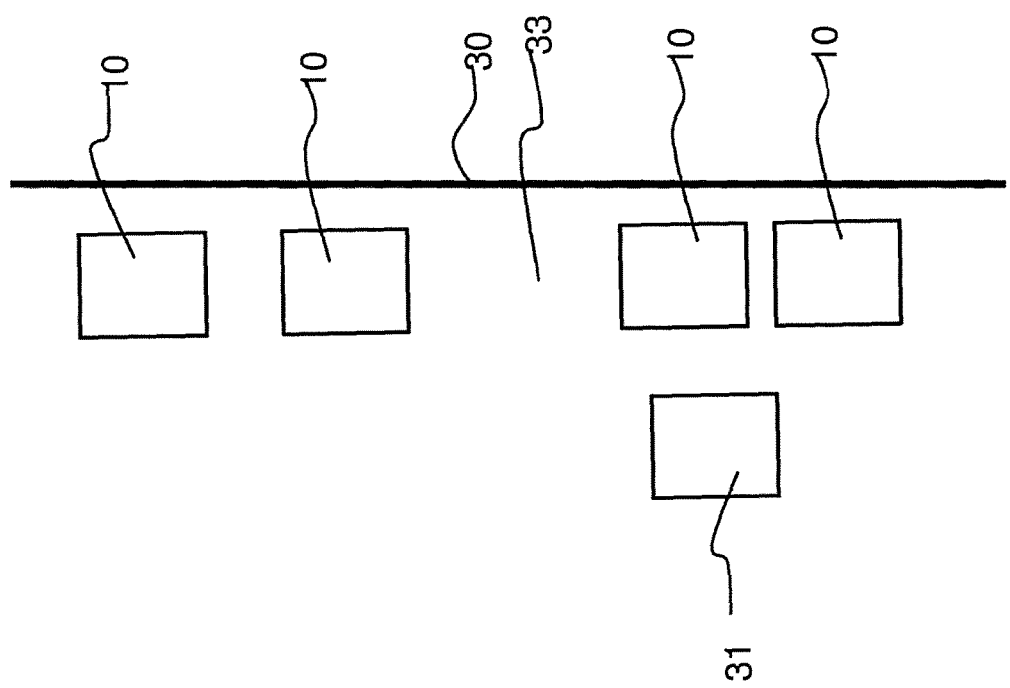
FIG. 3 shows a schematic illustration of the inventive system of an entry arrangement.

A further exemplary embodiment, shown by FIG. 3, explains how the position finding for indication as a delivery location can take place in the downtown area of cites.

The method shown by FIG. 3 is used to find parking spaces, for example at the edge 30 of a road, and hence to determine a delivery location. In this case, a large number of vehicles 10 are parking, which correspond to the vehicle 10 shown in FIG. 1.

The vehicle 31 looking for a stationing area also has an identical setup.

To implement the method according to the invention, it is advantageous that the vehicles 10, 31 have distance sensors that are mounted at the front, at the rear or at the side of the vehicles 10, 31 involved, such as ultrasonic, infrared and radar sensors, a camera, etc. In addition, the vehicles 10, 31 can use the computation unit 14 to perform vehicle-to-vehicle communication and/or vehicle-to-infrastructure communication using the communication devices 300/310. In addition, a navigation apparatus 15 is in place.

While looking for a parking space, the driver of the looking vehicle 31 first of all uses a key or a command to establish a connection to vehicles 10 in a circle of a predefined radius around the vehicle 31. This "awakes" the already parked vehicles 10 in the circle from what is known as a sleep mode (inactive state) and puts them into the active state. The vehicles 10 that are now in the active state then measure their distances from the next vehicle 10 or from the next infrastructure device (not shown), for example a set of traffic lights or a road sign, at the front, rear and/or at the sides.

Vehicle-to-vehicle communication is used to transmit the ascertained distance data from the vehicles 10 in the circle to the computation apparatus 14 of the vehicle 31 looking for a stationing area. In addition, the positions of the respective vehicles 10 are transmitted to the computation apparatus 14 of this vehicle 31. The computation apparatus 14 of the GPS system 12 can then use the information transmitted by C2C communication to establish the respective available area for parking. If the area is large enough, the corresponding free space is identified as a stationing area and is indicated to the driver as a stationing area available for parking. In the situation shown in FIG. 3, the parking space 33 is one such stationing area. After the vehicle 10 has occupied the parking space, the communication device 300 is used to transmit this position from the GPS system 12 to the system 40.

The navigation apparatus 15 can take the data ascertained by the computation apparatus 14 and compute the route from the current position of the vehicle 31 looking for a stationing area to the free stationing area 33 and can make the route available to the driver so that he can quickly find the parking space. If there are a plurality of free stationing areas in the vicinity of the vehicle 31, they can be presented on a display of the computation apparatus 14, so that the driver can select a stationing area that is suitable for him.

Figure 4:
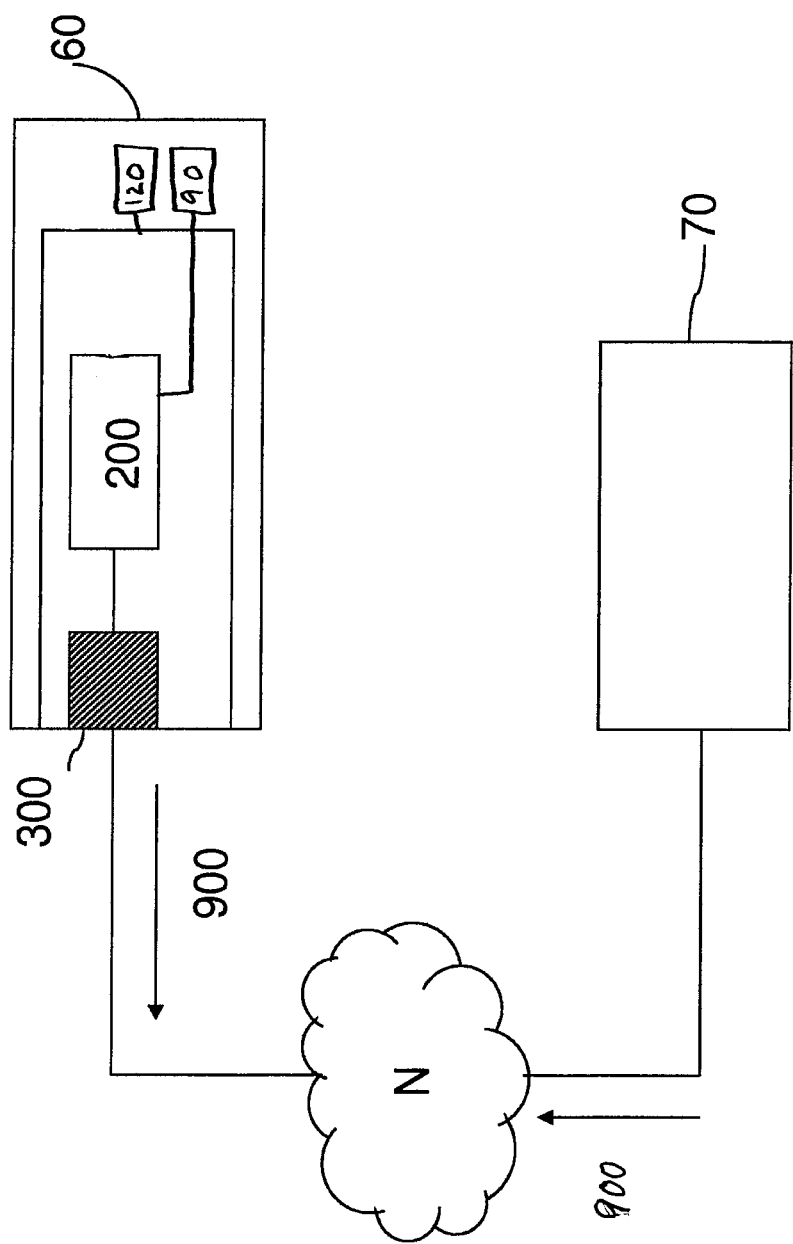
FIG. 4 shows a schematic illustration of an arrangement for the inventive method in which the updates are initiated via a mobile radio telephone.

FIG. 4 shows a schematic illustration of an entry arrangement 60 for the inventive method in which the update of the authorization data 200 is initiated via a mobile radio telephone 70 of the supplier. The figure also shows a mobile radio communication network N, the entry arrangement 60, the controller 120, the memory 90 and the communication device 300 of the controller 120.

According to the invention, this exemplary embodiment allows the authorized supplier to update the authorization data 200 of the entry arrangement 60 even without using a service control center. To this end, the mobile radio terminal 70 of the authorized supplier first of all sets up a connection via the mobile radio communication network N to the communication device 300/310 of the entry arrangement 60. The authorized supplier is then explicitly identified. This can be done in various ways. According to the invention, the controller 120 can produce an authorization code 900 and use the communication device 300/310 to send it to the mobile radio terminal 70 of the authorized supplier, for example as a short message—SMS. This authorization code 900 is stored in the mobile radio terminal 70 in a memory or on the SIM card thereof (not shown). If the user data 200 need to be updated, this authorization code 900 needs to be returned to the communication device 300. According to the invention two-part identification can then take place. This first of all involves a check to determine whether the authorization code 900 has been sent by a known mobile radio terminal 70, or the SIM card thereof. If this is the case, the authorization code 900 sent by the mobile radio 70 is then checked by the controller 120 of the entry arrangement 60 in a second step. If the result of this check is positive, the authorization data 200 are updated or erased in the controller 120 in accordance with the update request 150.

This method for identifying the supplier can also be provided with even further security by virtue of the communication device of the controller 300/310, having received the authorization code, sending a challenge, for example as a short message—SMS—, to an address (telephone number) that has previously been stored for a mobile radio in the controller 120 or in the communication device of the controller 310/300, the address then needing to be confirmed within a time window, e.g., again by a short message with an authorization code to the communication device of the controller 310/300. At this point, the information concerning what type of delivery is involved is also transmitted. The identification also allows the type of delivery to be indicated. In this regard, a warning signal is displayed to the driver via the driver assistance system when an activity has been performed, since the properties of the delivery require this.

A further possible identification method is the use of a challenge/response method, described in detail above, wherein a shared secret is exchanged in advance between the controller 120 of the entry arrangement 60 and the mobile radio terminal 70 of the supplier, or the SIM card thereof. In this context, the mobile radio terminal 70 of the supplier needs to authenticate itself to the entry arrangement 60.

The methods described above can be used advantageously not only for erasing user data 200 in the memory 90 but also for reactivating user data 200.

According to the invention, the methods described can also be applied to RKE—remote keyless entry—keys or else engine immobilizers.

Figure 5:
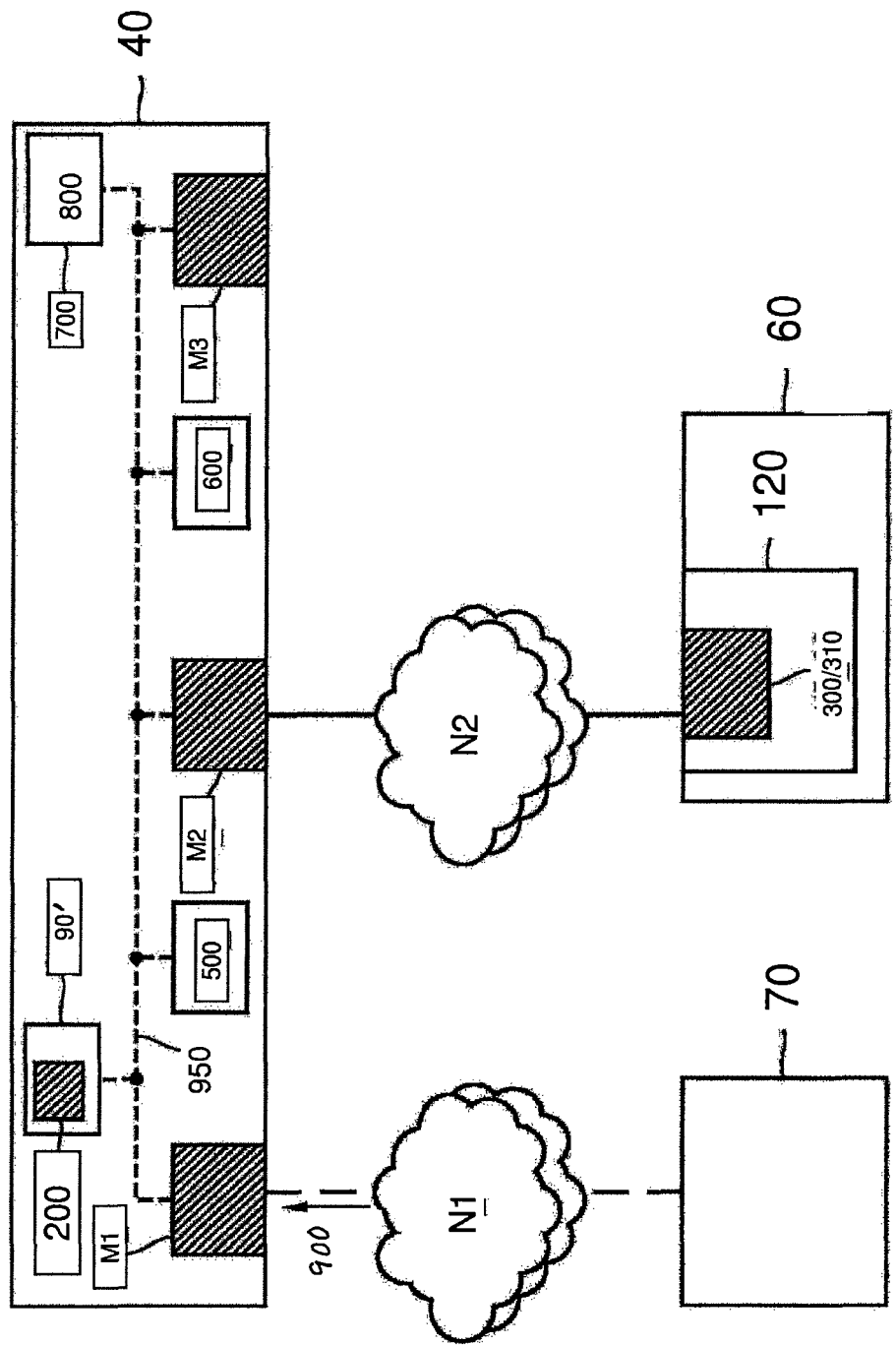
FIG. 5 shows a schematic illustration of an arrangement for implementing the inventive system.

FIG. 5 schematically shows a system for conveying consignments. The system has a memory 90' and authorization data 200 stored therein. The memory 90' is connected via a data bus 950 to a first identification module that allows a first identification routine 500. Furthermore, this data bus 950 has a second identification module and an update module 700 connected to it that allow a second identification routine 600 and an update routine 800, respectively. Finally, the system has at least three communication modules M1, M2 and M3. The first communication module M1 can be used to set up a communication link from the communication terminal 70 of a supplier via a mobile radio communication network N1. The second communication module M2 can set up a communication link to the controller 120 of the entry arrangement 60 via a second communication network N2 using the communication device 300/310 of the controller 120.

Again, the invention allows the authorized supplier of the authorization data 200 to use its communication terminal 70 to set up a communication link to the system 40 via the communication network N1 using the communication device 100 of the system. In this case, the communication-network-specific protocols of the communication network N1 are used. The first identification routine 500 is then used to identify the authorized supplier using one of the identification methods described above. Subsequently, the supplier uses its communication terminal 70 to transmit an update request 150 to the system. The second communication module M2 is then used to set up a mobile radio link to the controller 120 of the entry arrangement 60 via the mobile radio communication network N2 using the communication device 300/310 of said controller.

The system is then explicitly identified by the controller 120. This involves the use of the second identification routine 600. One of the methods described above can be used for identification in this case.

Once identification has taken place, the authorization data 200 are updated both in the controller 120 and in the memory 90 of the system. This involves the application of the update routine 800. In this case, the update is performed in accordance with the update request 150 from the authorized supplier.

Neither the inventive method nor the inventive arrangement is limited to the exemplary embodiments, but rather they can be used in all entry arrangements, e.g., for buildings or electrical devices, that have communication devices for communication via communication networks. This requires the communication devices to be coordinated with the communication networks and identification methods used.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for conveying consignments in vehicles, comprising:
   a first communication module (M1) configured to set up a communication link to a communication terminal (70) of a supplier of authorization data (200) via a communication network (N1);
   a first identification module configured to execute a first identification routine that explicitly identifies a supplier;
   a second communication module (M2) configured to set up a communication link via a wireless communication network (N2) to a communication device (300) of a controller (120) of an entry arrangement (60) of a vehicle;
a second identification module configured to execute a second identification routine that explicitly identifies the system (40) by the entry arrangement (60);
a third communication module (M3) configured to receive an update request information item from a driver of the vehicle; and
an update module (700) configured to execute an update routine (800) that updates authorization data (200) in a memory (90') of the system (40),
wherein:
following execution of the update routine (800) to update the authorization data (200), the system transmits, via the wireless communication network (N2), a piece of information relating to a delivery that has been made and a content of the delivery to the communication device (300) of the controller (120) of the entry arrangement (60) of the vehicle,
the controller (120) of the entry arrangement (60) of the vehicle uses a bus system in the vehicle to produce a message for a driver assistance system (130) relating to the delivery that has been made and the driver assistance system uses a man/machine interface to display a warning message (130a) relating to the delivery, and
the vehicle engine is immobilized by an engine immobilizing system, under the control of the controller (120) of the entry arrangement (60), based on the produced message.

2. The system (40) as claimed in claim 1, wherein the bus system in the vehicle is a CAN bus.

3. The system (40) as claimed in claim 1, wherein the bus system in the vehicle is an Ethernet.

4. The system (40) as claimed in claim 1, wherein the warning message is displayed by the driver assistance system only after a check has been carried out to determine whether the passenger has left his seat and the entry arrangement has been activated by opening of a door of the vehicle.

5. The system (40) as claimed in claim 1, wherein the wireless communication network (N2) is a mobile radio communication network.

6. The system (40) as claimed in claim 1, wherein the system is configured to identify a user by voice recognition, by the transmission of an identification information item—PIN/TAN—or by a challenge/response method.

7. The system (40) as claimed in claim 1, wherein the system is configured to identify a user using an explicit cryptographic information item.

8. The system (40) as claimed in claim 1, further comprising a communication link via the wireless communication network (N2) using a mobile radio communication network and/or WLAN network.

9. The system (40) as claimed in claim 1, further providing an encryptor configured to encrypt, using a shared secret, the communication between the system (40) and the communication device (300/310) of the entry arrangement (60).

* * * * *